United States Patent [19]

Rost

[11] Patent Number: 5,218,992
[45] Date of Patent: Jun. 15, 1993

[54] CHECK VALVE RETAINER

[75] Inventor: Alvin Rost, Fridley, Minn.

[73] Assignee: Dana Corporation, Toledo, Ohio

[21] Appl. No.: 722,911

[22] Filed: Jun. 28, 1991

[51] Int. Cl.$^5$ .................. F16K 15/04; A15B 13/08
[52] U.S. Cl. .................. 137/519.5; 137/533.11; 137/596.13
[58] Field of Search ............ 137/519.5, 533.11, 596.13

[56] References Cited

U.S. PATENT DOCUMENTS

| | | | |
|---|---|---|---|
| 3,303,746 | 2/1967 | Schmoeger | 137/599.2 X |
| 3,323,421 | 6/1967 | Olmsted . | |
| 3,565,110 | 2/1971 | Hodgson | 137/596.12 |
| 3,605,808 | 9/1971 | Fisher | 137/599.2 |
| 3,878,864 | 4/1975 | Schurger | 137/596.13 |
| 3,989,113 | 11/1976 | Spring et al. . | |
| 4,095,617 | 6/1978 | Hodgson | 137/596.13 |
| 4,155,374 | 5/1979 | Diehl . | |
| 4,646,775 | 3/1987 | Traylor | 137/860 X |
| 4,796,860 | 1/1989 | Diel | 251/297 |
| 5,000,001 | 3/1991 | Christensen et al. | 137/596 X |

FOREIGN PATENT DOCUMENTS 2135023 8/1984 United Kingdom ........... 137/533.11

Primary Examiner—Gerald A. Michalsky

[57] ABSTRACT

A fluid control check valve incorporating an improved internal check ball retainer. The valve includes a cylindrical body portion having a radially inwardly extending chamber and a passageway extending through the valve and communicating with a radial inner end of the chamber. A ball is disposed within the chamber to block communication between the chamber and the passageway. The cylindrical body portion has a groove about its periphery which extends through a radial outer end of the chamber. A retainer is disposed in the groove to retain the ball within the chamber.

12 Claims, 3 Drawing Sheets

CHECK VALVE RETAINER

BACKGROUND OF THE INVENTION

The present invention relates generally to an improved valve, and more particularly, but not by way of limitation, to a ball check valve having an improved retainer.

Check valves are used to control the flow of fluid in substantially one direction. Typically, ball check valves are used to perform this function. Ball check valves include a ball disposed within a chamber of the valve. The chamber communicates with a hole defined in the valve. The chamber and the hole are connected by a ball seat. The ball is positionable to sit within the ball seat to block communication between the hole and the chamber. The ball is retained within the chamber by an internal retainer on one side of the ball and the ball seat on its other side. Some examples of internal retainers are a fixed precision pin extending through the chamber, a fixed pin and spring for biasing the ball against the ball seat, or an M shaped retainer held within the hole by a connector. Such internal retainers are relatively difficult to manufacture and assemble. In addition, such valve retainers are relatively costly.

After an extended period of use, the internal valve retainer and/or ball will wear and require replacement. Such existing internal retainers are troublesome to remove and/or replace. In one case, the connector must be disconnected from the valve before the M shaped retainer can be removed. In another case, the retainer pin must be bored out of the valve and a new pin fitted to such bore. Thus, the replacement of such internal retainers is time consuming and costly.

SUMMARY OF THE INVENTION

The present invention provides a valve having an improved check ball retainer which is easy to manufacture, assemble and disassemble. The valve comprises a body portion having a central axis. The body portion has a chamber which extends radially inwardly from a first surface area of the body portion toward the central axis, and has a passageway which communicates with and extends inwardly from an inner end of the chamber and to a second surface area of the body portion. The body portion has a shoulder portion at the inner end of the chamber.

The valve also includes means movably disposed in the chamber for blocking the passageway. Defined about the body portion's periphery is a groove which extends through an outer end of the chamber. The valve includes a retainer disposed in the groove for retaining blocking means within the chamber.

DESCRIPTION OF THE PREFERRED EMBODIMENT

Figure 1:
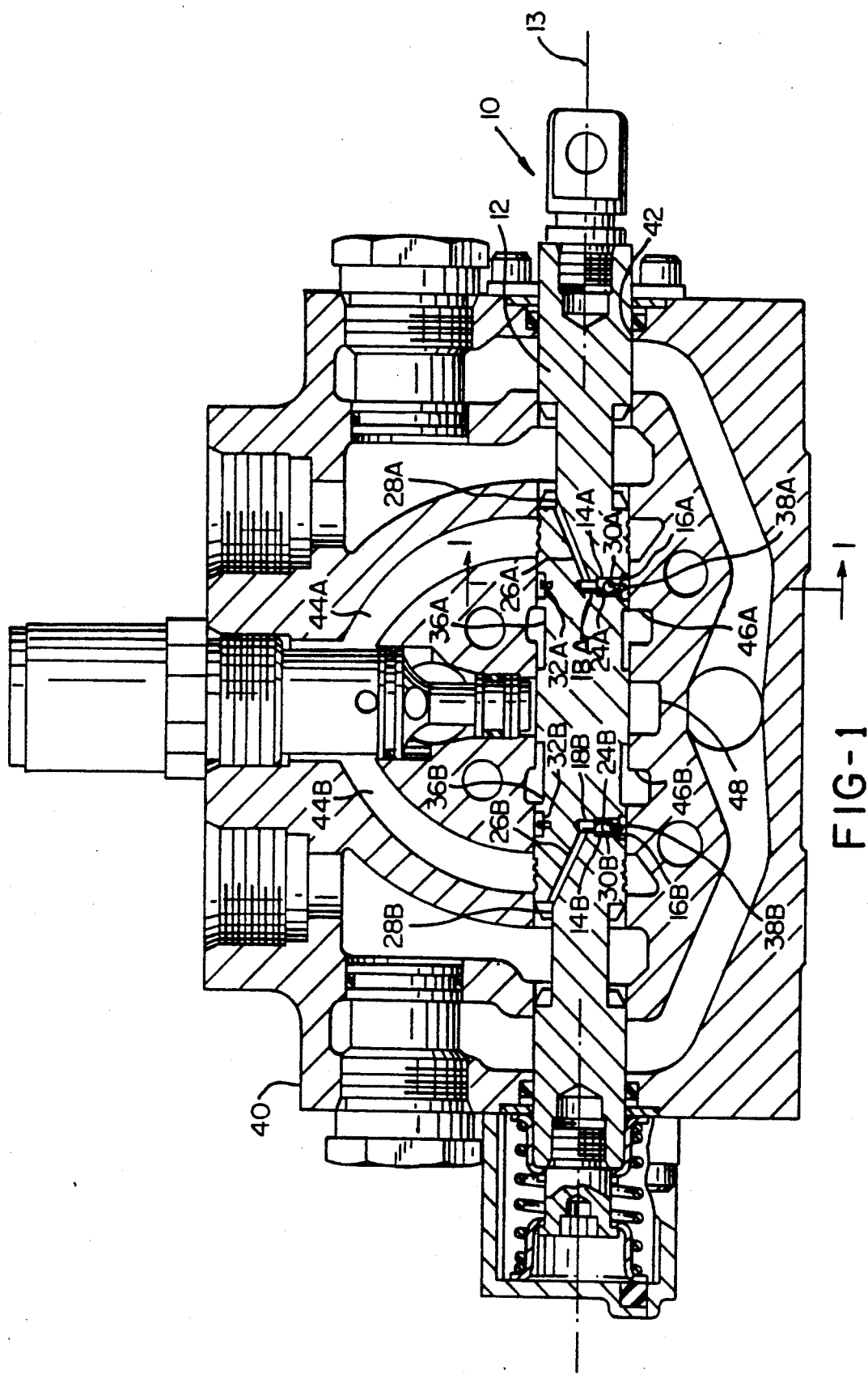
FIG. 1 is a sectional view of the valve as used in the present invention.
Figure 2:
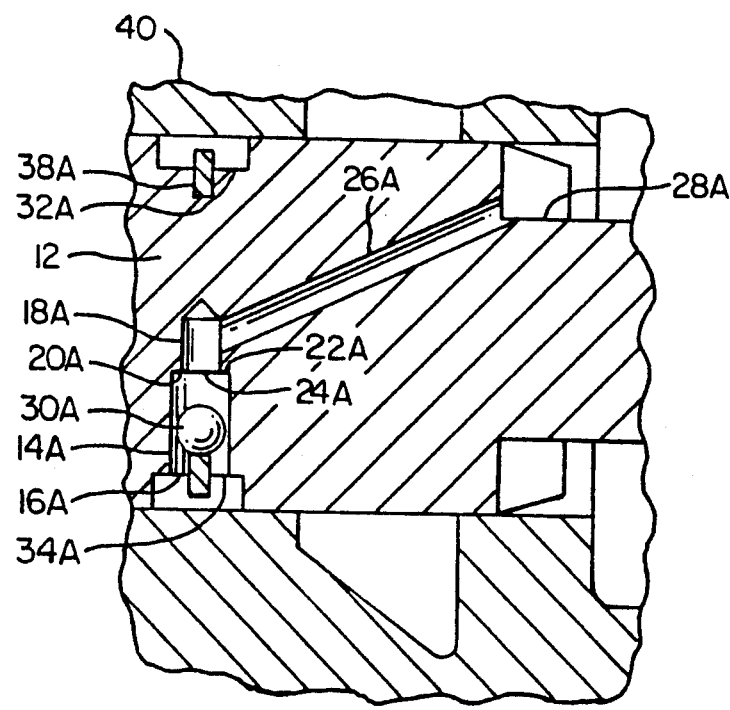
FIG. 2 is an enlarged sectional view of a part of FIG. 1.
Figure 3:
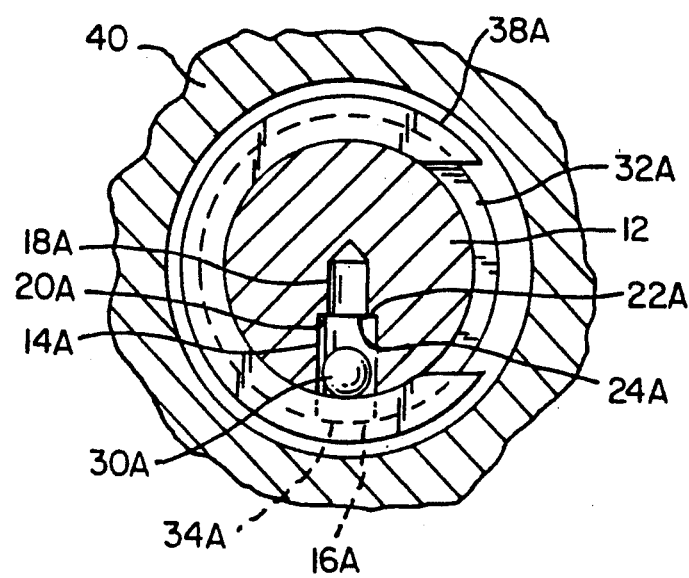
FIG. 3 is an enlarged sectional view of the valve taken along line 1—1 of FIG. 1.

The valve 10 is shown in FIG. 1 and enlarged portions thereof in FIGS. 2 and 3. The valve 10 includes a generally cylindrical body portion 12 having a central axis 13.

The body portion 12 has two large diameter chambers 14A and 14B which extend radially inwardly from surface areas 16A and 16B, respectively, and toward the central axis 13. The body portion 12 further includes two small diameter chambers 18A and 18B which are co-axial and communicate with the large diameter chambers 14A and 14B, respectively.

Figure 4:
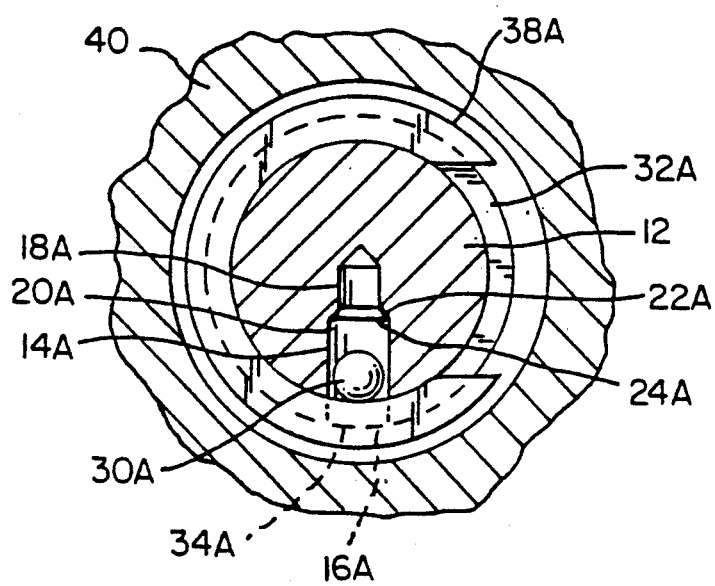
FIG. 4 is an enlarged sectional view of another embodiment of the valve.

As best seen in FIGS. 2 and 3, chamber 18A extends radially inwardly from inner end 20A of the large chamber 14A. Similarly, chamber 18B extends radially inwardly from inner end 20B (not shown) of the large chamber 14B. The body portion 12 has shoulder portions 22A and 22B (not shown) at inner ends 20A and 20B (not shown) of the chambers 14A and 14B, respectively. Shoulder portion 22A connects chambers 14A and 18A with ball seat 24A formed at the inner portion thereof. Shoulder portion 22B and ball seat 24B are similarly formed. Alternatively, as seen in FIG. 4, the shoulder portions 22A and 22B have a frustoconical aspect which forms ball seats 24A and 24B (not shown). The body portion 12 has ports 26A and 26B which diagonally inwardly extend from surface areas 28A and 28B, respectively, and communicate with chambers 18A and 18B, respectively.

Check balls 30A and 30B are movably disposed within the chambers 14A and 14B, respectively. When the balls 30A and 30B are positioned in the ball seats 24A and 24B, respectively, substantially no communication exists between the chamber 14A and the chamber 18A, or the chamber 14B and the chamber 18B. The balls 30A and 30B are of a sufficient size to substantially sealably sit in the ball seats 24A and 24B, respectively.

Annular grooves 32A and 32B are defined about the body portion's 12 periphery such that grooves 32A and 32B pass through outer ends 34A and 34B (not shown), respectively, of chambers 14A and 14B. Also, annular grooves 36A and 36B are defined about the body portion's 12 periphery and between grooves 32A and 32B.

The ball retainers 38A and 38B are disposed in grooves 32A and 32B, respectively, to retain the balls 30A and 30B within the chambers 14A and 14B, respectively. As shown in FIG. 3, the retainers are C shaped snap rings, such as CRESCENT ® retaining rings, wherein a portion of the rings extend through the outer ends of the large diameter chambers. The retainers 38A and 38B are of such size and width to fit within the grooves 32A and 32B and retain balls 30A and 30B, respectively, while allowing for maximum communication between chamber 14A and the groove 32A, and chamber 14B and groove 32B.

In the preferred embodiment, the valve 10 has a diameter of about 0.875 inch. The grooves 32A and 32B have a widths of about 0.225 inch. The large diameter chambers 14A and 14B have a diameter of about 0.156 inch. The diameter of the ball 30A and 30B are about 0.125 inch. The retainers 38A and 38B are approximately 0.042 inch thick and have a 0.608 inch inner opening diameter.

The valve 10 is easily assembled by placing the balls 30A and 30B into their respective large chambers 14A and 14B and positioning their retainers 38A and 38B in their respective grooves 32A and 32B. FIG. 3 illustrates the retainer 38A positioned about the body portion 12. The valve 10 is then slid into its operating position within a valve housing 40, as seen in FIG. 1. The valve housing 40 has a valve receiving opening 42, and communicating openings 44A and 44B, 46A and 46B and 48. The valve 10 is made to reciprocate within the valve housing 40 so that when port 26A and groove 32A align with openings 44A and 46A, respectively, communication exists between opening 44A and 48. Similarly, when port 26B and grooves 32B align with openings 44B and 46B, respectively, communication exists between openings 44B and 48.

The retainers therefore provide a means of externally retaining the balls within the large diameter chamber of the valve. The retainer are easily removable and replaceable with little expense of time or money.

The preferred embodiment depicts the valve including two of the above described connecting chambers, ports and grooves having a ball disposed in each large chamber and a retainer in each groove. It is comprehended that the valve may included only one, or more than two such connecting chambers, ports, grooves, balls and retainers. The present invention has been described in conjunction with a specific embodiment. However, it is conceived that many modifications, alternatives, and variations will be apparent to persons of ordinary skill in the art.

What is claimed is:

1. A valve which comprises:
a generally cylindrical body portion having a central axis, a chamber which extends radially inwardly from a first surface area and toward said central axis of said body portion, a passageway which communicates with and which extends inwardly from an inner end of said chamber to a second surface area of said body portion, a shoulder portion adjacent said inner end of said chamber, and a groove about the periphery of said body portion, said groove extending through an outer end of said chamber;
a substantially spherical ball movably disposed within said chamber for blocking said passageway; and
a retainer disposed in said groove for retaining said ball in said chamber.

2. The check valve of claim 1, wherein said groove has a width greater than a diameter of said chamber and has a shoulder portion formed therebetween.

3. The check valve of claim 2, wherein said groove is step shaped with the deepest part of said groove accommodating said retainer.

4. A valve which comprises:
a body portion having a central axis, a chamber which extends radially inwardly from a first surface area and toward said central axis of said body portion, a passageway which communicates with and which extends inwardly from an inner end of said chamber to a second surface area of said body portion, a shoulder portion adjacent said inner end of said chamber, and an annular groove about the periphery of said body portion, said groove extending through an outer end of said chamber;
means movably disposed within said chamber for blocking said passageway; and
a C shaped snap ring disposed in said groove for retaining said blocking means in said chamber having a portion sufficiently extending through said outer end of said chamber to retain said blocking means, said ring having an opening about its circumference less than the diameter of said groove but sufficient for said ring to open for direct insertion into and fitting about the diameter of said groove without permanent deformation of said ring.

5. The check valve of claim 4, wherein said groove has a width greater than a diameter of said chamber and has a shoulder portion formed therebetween.

6. The check valve of claim 5, wherein said groove is step shaped with the deepest part of said groove accommodating said C shaped snap ring.

7. A valve which comprises:
a body portion having a central axis, a large diameter chamber which extends radially inwardly from a first surface area of said body portion and toward said central axis, a small diameter chamber co-axial with said large diameter chamber which communicates with and which extends radially inwardly from an inner end of said large diameter chamber and toward said central axis, a ball seat at said inner end of said large diameter chamber, a port which extends diagonally inwardly from a second surface area of said body portion and communicates with said small diameter chamber, and a groove about the surface of said body portion, said groove extending through an outer end of said large diameter chamber;
a ball movably disposed within said large diameter chamber for blocking communication between said large diameter chamber and said small diameter chamber when positioned in said ball seat; and
a retainer having an opening about its circumference less than the diameter of said groove but sufficient for said retainer to open for direct insertion into and fitting about the diameter of said groove without permanent deformation of said retainer, said retainer disposed in said groove for retaining said ball in said large diameter chamber.

8. The valve of claim 7 wherein said body portion is generally cylindrical, and wherein said ball seat is frustoconical shaped.

9. The valve of claim 8 wherein said groove is annular and said retainer is a C shaped snap ring having a portion sufficiently extending through said outer end of said chamber to retain said ball.

10. The valve of claim 7, wherein said groove is step shaped with the deepest part of said groove accommodating said retainer.

11. The check valve of claim 7, wherein said groove has a width greater than the diameter of said large diameter chamber and has a shoulder portion formed between said large diameter chamber and said groove.

12. The check valve of claim 11, wherein said groove is step shaped with the deepest part of said groove accommodating said retainer.

* * * * *